Sept. 1, 1953     H. F. GRATHWOHL     2,650,450
FISHING LURE
Filed July 20, 1950

INVENTOR.
HERBERT F. GRATHWOHL
BY
ATTORNEY

Patented Sept. 1, 1953

2,650,450

UNITED STATES PATENT OFFICE 2,650,450

FISHING LURE

Herbert F. Grathwohl, Bronx, N. Y.

Application July 20, 1950, Serial No. 174,821

3 Claims. (Cl. 43—42.32)

This invention relates to new and useful improvements in fishing lures.

One object of the invention is the provision of an improved lure adapted, when pulled through the water, to gyrate or dance, the lure having therein transparent or translucent eyes through which beams of sunlight flash during said gyrations.

Another object of the invention is to form the lure and to secure the said eyes therein so that the same is capable of long life.

Still another object of the invention is to form the lure so that the same is ideally adapted to cause the said gyrations when pulled through the water.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 6:
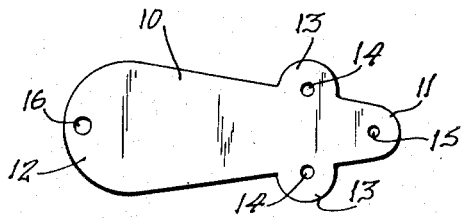
Fig. 6 is a plan view of the blank from which the lure is formed.
Figure 5:
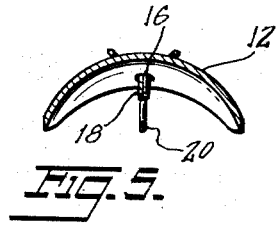
Fig. 5 is an enlarged sectional view on line 5—5 of Fig. 1.

The blank 10 from which the lure of the invention is formed is illustrated in Fig. 6 and comprises a flat sheet of brass or other non-corrosive metal. As shown, the front end 11 of the blank is narrower than the rear end 12 and both ends are arcuate in shape. Shortly behind the front end 11 the side edges of the blank are extended outward to provide arcuately configured ears 13 each having a perforation 14 at the base thereof. Also provided is a perforation 15 at the front end of the blank and a countersunk perforation 16 at the rear end thereof.

Figure 4:
Fig. 4 is an enlarged fragment of a portion of Fig. 3.
Figure 7:
Fig. 7 is an enlarged perspective view of the blank for one of the above-mentioned eyes.

The perforations 14 in the ears 13 are adapted to form eyes for the lure and to this end plugs 17 of colored transparent or translucent colored plastic material such as Lucite, Plexiglas, nylon or the like, are provided, see Fig. 7. Referring also to Fig. 4, the plugs 17 are of slightly larger diameter than the perforations 14 and are forced through such perforations. Thus, the portion of the plug engaged in the perforation is compressed, whereas the portions thereof external of the perforation are in normal or expended condition and overlap the edges of the perforation. This, it will be seen, securely locks the plugs or eyes in said perforations.

Figure 1:
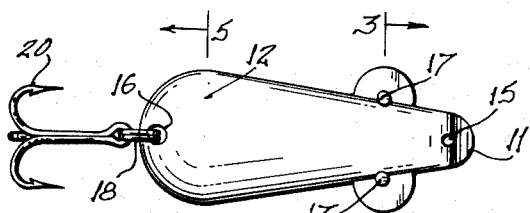
Fig. 1 is a bottom view of the lure.
Figure 3:
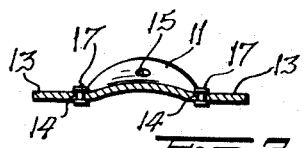
Fig. 3 is an enlarged sectional view on line 3—3 of Fig. 1.
Figure 2:
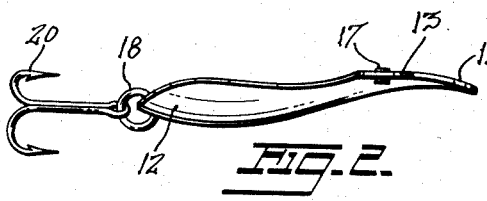
Fig. 2 is a side elevation of the lure.

In order for the lure to gyrate in the water as mentioned above, the blank 10 is pressed to the S-shaped longitudinal, and concavo-convex lateral configuration shown in Figs. 1, 2, 3 and 5. As shown the concavo-convex lateral curvature of the lure tapers in degree from the maximum near the wider rear end 12 thereof to a minimum between the ears 13. The said ears are not bent during the formation of the lure and thus project horizontally from either side of the concavo-convex portion of the lure. Referring particularly to Fig. 2, it will be seen that, using the horizontal ears 13 as a reference, the S-shaped longitudinal configuration of the lure is tilted downward somewhat toward the rear end 12.

As shown in Figs. 1 and 2 the countersunk hole 16 at the rear end 12 of the lure is engaged by an ordinary split ring 18 attached to a suitable hook 20. The perforation 15 at the front end of the lure is utilized for attaching a line thereto in the usual manner.

For the most desirable results the lure is either highly polished or is plated so as to sparkle in the light of the sun.

The lure, by its configuration, is adapted to be pulled through the water at a depth of about two feet with the convex side thereof downward. As it moves through the water, the flow of the water over its convexo-concave S-shaped surface causes it to gyrate or dance. The faster it is moved through the water the more agitated its dancing motion becomes. During the said gyrations beams of light are reflected off the polished surface of the lure and through the transparent eyes 17 and attract fish to the lure.

It will be seen, therefore, that there has been provided a fishing lure that not only is effective but is sturdy and long wearing, and which includes no parts which can break loose and be lost.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. A fishing lure having an elongated laterally curved body with a narrow rounded front end and a wider rounded rear end, integral flat ears projecting horizontally from opposite sides of the body closely adjacent the front end thereof, each of said ears having a perforation adjacent the side of the body, and a cylindrically shaped eye member of transparent material mounted through each of said perforations in a force fit and projecting on both sides of said ears.

2. A fishing lure having an elongated one piece laterally curved body with a narrow rounded front end and a wider rounded rear end, flat ears projecting horizontally from opposite sides of the body closely adjacent the front end thereof, each of said ears having a perforation adjacent the sides of the body, and a cylindrically shaped eye of transparent material mounted through each of said perforations in a force fit, each of said eyes being formed of a suitably colored plastic material.

3. A fishing lure having an elongated laterally curved body with a narrow rounded front end and a wider rounded rear end, flat ears projecting horizontally from opposite sides of the body closely adjacent the front end thereof, each of said ears having a perforation, and a separate eye member of transparent material mounted through each of said perforations and having flanged end portions, each of said eye members being a slightly elongated cylindrical plug of plastic having a diameter slightly greater than the diameter of the respective perforation with the intermediate portions of the plugs compressed in a force fit within said perforations and the end portions of the plugs engaging the material of said ears defining said perforations to retain said plugs fixedly in position in said perforations.

HERBERT F. GRATHWOHL.

References Cited in the file of this patent

UNITED STATES PATENTS

| Number | Name | Date |
|---|---|---|
| D. 87,050 | Dunkelberger | May 31, 1932 |
| 784,398 | Heckeler | Mar. 7, 1905 |
| 869,565 | Haverly | Oct. 29, 1907 |
| 1,067,178 | Lambert | July 8, 1913 |
| 1,115,743 | Selig | Nov. 3, 1914 |
| 1,847,397 | Hofschneider | Mar. 1, 1932 |
| 1,861,110 | Campbell | May 31, 1932 |
| 1,866,465 | Harrington et al. | July 5, 1932 |
| 1,963,380 | Peters et al. | June 19, 1934 |
| 2,298,811 | Sisco | Oct. 13, 1942 |
| 2,481,445 | Premo, Jr. | Sept. 6, 1949 |